Nov. 7, 1967     D. E. LEWIS ET AL     3,351,316
PILOT OPERATED PISTON VALVE
Filed Jan. 15, 1965     2 Sheets-Sheet 1
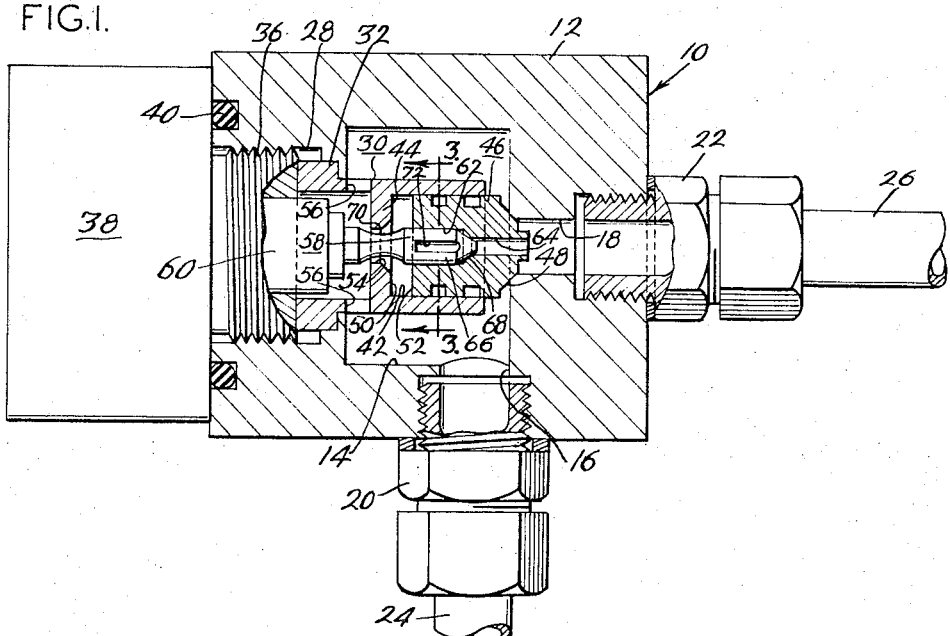
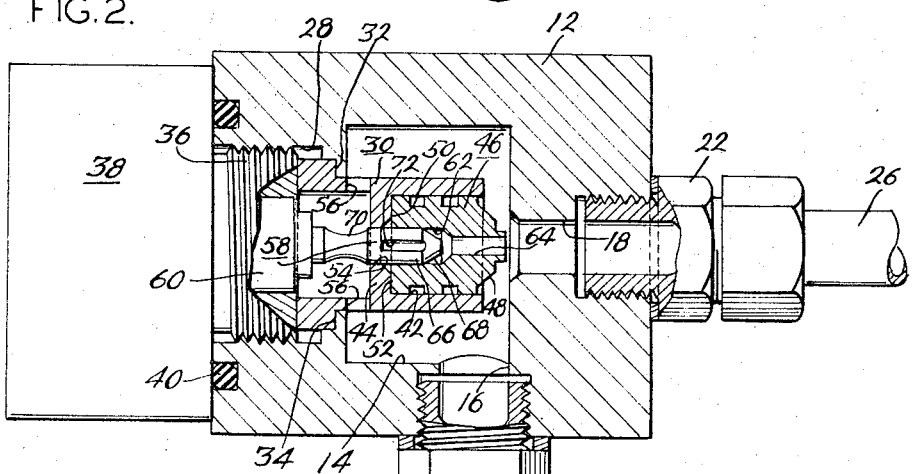
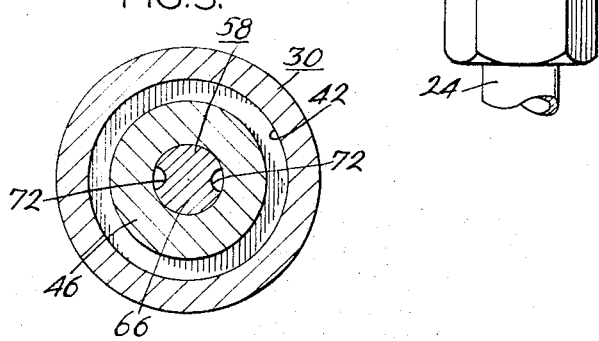
INVENTORS:
DONALD E. LEWIS
DOUGLAS A. BIESECKER
BY Howson & Howson
ATTYS.

Nov. 7, 1967  D. E. LEWIS ET AL  3,351,316

PILOT OPERATED PISTON VALVE

Filed Jan. 15, 1965  2 Sheets-Sheet 2

INVENTORS:
DONALD E LEWIS
DOUGLAS A. BIESECKER

Howson & Howson
ATTYS.

United States Patent Office

3,351,316
Patented Nov. 7, 1967

3,351,316
PILOT OPERATED PISTON VALVE
Donald E. Lewis, 112 Gentilly Drive, and Douglas A. Biesecker, R.D. 2, both of Clarks Summit, Pa. 18411
Filed Jan. 15, 1965, Ser. No. 425,704
3 Claims. (Cl. 251—30)

ABSTRACT OF THE DISCLOSURE

A plunger-type pilot valve for high pressure fluid systems in which the valve is maintained in the open or the closed positions by the pressure of the fluid in the system. A pilot valve is provided to reverse the direction of fluid pressure on the valve upon movement of the pilot valve from one position to another and cause the fluid pressure in the system to move the valve from the open to the closed position or vice versa as desired.

---

The present invention relates generally to valves for controlling fluid flow in a fluid system and more particularly to pilot valves of the plunger type wherein actuation of the main valve plunger is effected by means of the fluid pressures in the system.

The present pilot valve design has been developed for use in high pressure fluid systems wherein reliability and rapid operation of the valve is of critical importance. The valve is characterized by a simplicity of design which permits a light-weight construction and provides trouble-free service. The valve is especially adapted for remote control installations and is thus suited for use in aircraft, rockets and similar fluid systems where a high performance valve is necessary.

It is accordingly a first object of the present invention to provide a pilot valve of a simple, compact and light-weight design having exceptionally fast response characteristics.

A further object of the invention is to provide a pilot valve as described wherein, when the valve is in the open position, there is no fluid flow through the main plunger actuating channels and thus a reduced possibility of fouling of the valve.

Another object of the invention is to provide a pilot valve as described having separate opening and closing fluid paths for the actuation of the main plunger thus permitting independent valve opening and closing characteristics.

A further object of the invention is to provide a pilot valve as described which does not require the use of dynamic seals and which requires little maintenance.

Additional objects and advantages of the invention will be more readily apparent from the following detailed description of embodiments thereof when taken together with the accompanying drawings in which:

FIG. 1 is a sectional view of a two-way pilot valve embodying the present invention with the valve shown in the closed position;

FIG. 2 is a view as in FIG. 1 showing the valve in the open position;

FIG. 3 is a sectional view taken along line 3—3 of FIG. 1 showing the details of the interacting pilot plunger and main plunger;

Figure 4:
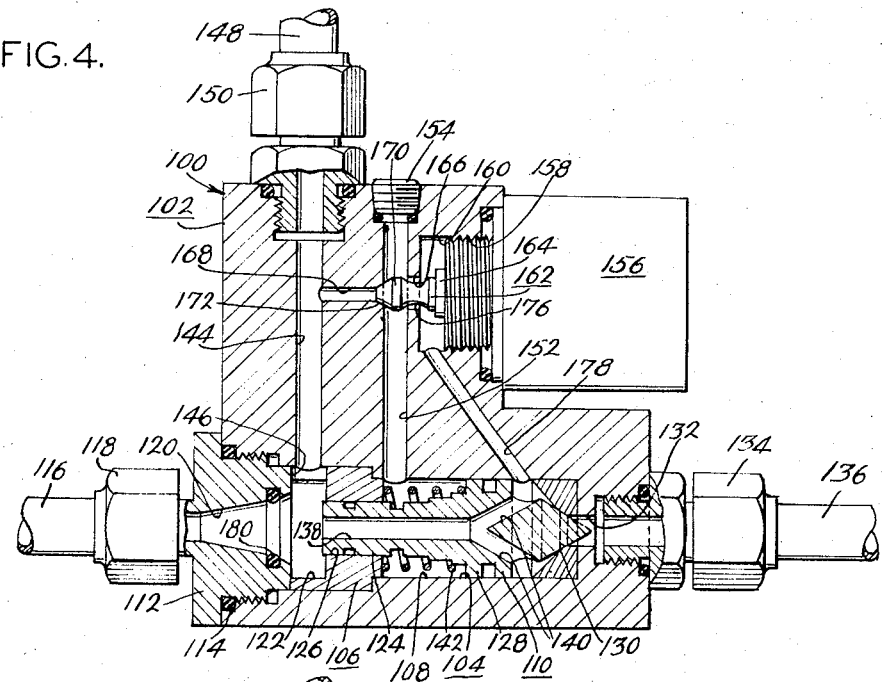
FIG. 4 is a sectional view of a three-way valve embodying the present invention showing the valve in the closed position.

Referring to FIGS. 1–3 of the dawings, a two-way pilot valve 10 is shown embodying the present invention and includes a valve body 12 having a valve cavity 14 therein. Inlet and outlet ports 16 and 18 in the valve body open into said valve cavity and are connected by means of terminal fittings 20 and 22 respectively with fluid inlet and outlet conduits 24 and 26 which constitute a portion of a fluid system through which flow is to be controlled.

Introduced into the valve cavity 14 by means of the annular bore 28 is a main plunger housing 30 which is opposed from and axially aligned with the outlet port 18. An annular shoulder 32 of the main plunger housing is seated on a shoulder 34 of the valve body and the housing is secured in position by the abutting cylindrical portion 36 of an actuator 38 which is threadedly mounted in the bore 28. A seal ring 40 provides a fluid-tight connection between the actuator and valve body.

The portion of the main plunger housing 30 which extends into the valve cavity 14 includes a cylindrical main plunger chamber 42 which opens toward the outlet cavity 18 at one end and which is bounded by the wall 44 at the opposite end. A cylindrical main plunger 46 is slidably disposed with the main plunger chamber 42 and is provided with a suitable sealing face 48 for coaction with the outlet port 18 for tightly sealing the outlet port when the plunger is in the closed position shown in FIG. 1. With the main plunger 46 in the closed position, a fluid space 50 between the rear face 52 of the main plunger and the wall 44 is open to the fluid pressure of the valve cavity through the concentric orifice 54 in the wall 44 and the radial apertures 56 in the main plunger housing to the rear of the wall 44.

A pilot plunger 58 extending from the actuator piston 60 passes through the orifice 54 and into a pilot plunger chamber 62 within the main plunger 46. A pilot plunger port 64 connects the pilot plunger chamber 62 with the center of the plunger face 48 and thus in the closed position of the main plunger opens into the outlet port 18.

The pilot plunger 58 includes a cylindrical outer end portion 66 having an appropriately shaped end face 68 for sealing coaction with the port 64. Rearwardly of the cylindrical portion 66 is a neck portion 70 of a reduced diameter which when the pilot plunger is seated against the port 64 in the closed position of the valve shown in FIG. 1, is positioned opposite the orifice 54, the neck portion being of a sufficiently smaller diameter than the orifice to permit fluid flow therearound. The cylindrical portion 66 of the pilot plunger is of such a diameter as to fit in sliding and substantially fluid sealing relation within the pilot plunger chamber 62 and is similarly related to the orifice 54 such that in the retracted position of the pilot plunger shown in FIG. 2, the cylindrical portion 66 closes and seals the orifice 54. Flutes 72 extend axially part way along the surface of the cylindrical portion 66 from the forward end of the pilot plunger a distance which is insufficient to open the port 64 to the main plunger chamber 42 in the closed position of the valve illustrated in FIG. 1, but sufficient to open the partially vacated pilot plunger chamber 62 to the main plunger chamber 42 when the pilot plunger is initially retracted to the position of the pilot plunger shown in FIG. 2 for a purpose to be presently described.

The actuator 38 may be any means for imparting an axial motion to the pilot plunger and may be electrically, hydraulically, mechanically or manually operated. As will be clear from the following, a very small actuator force is required to move the pilot plunger and effect a rapid and fluid pressure powered actuation of the valve.

In operation, the inlet conduit 24 is connected with a source of fluid under pressure and the outlet conduit 26 to a hydraulic device to which the flow of fluid is to be controlled. Upon movement of the pilot plunger into a seated position within the pilot plunger chamber 62, high pressure fluid in the valve cavity 14 passes through the apertures 56, orifice 54 and by virtue of the beveled configuration of the orifice facing the main plunger, exerts a force on a portion of the rear face 52 of the main plunger moving the plunger toward the outlet port 18. As the plunger moves away from the wall 44, the full area of the rear face 52 is subjected to the high pressure in the valve cavity, and, since the flow of fluid from the valve cavity into the outlet port drops the pressure across the face 48 of the main plunger, the pressure differential on the ends of the main plunger acts to move the plunger into the closed position shown in FIG. 1. The plunger face 48 is maintained in a tight sealing relation against the port 18 by virtue of the continuing high pressure fluid in the space 50 to the rear of the valve plunger.

For opening the valve, the pilot plunger is moved by the actuator to the position shown in FIG. 2 thereby closing the orifice 54 to cut off the space 50 of the main plunger chamber from the high pressure fluid in the valve cavity and, at the same time, opening the space 50 to the low pressure of the outlet conduit by means of the flutes 72 and port 64. The lowering of the pressure in this region behind the rear face of the main plunger together with the presence of a high pressure force on the portion of the face 48 exposed within the valve cavity results in a pressure differential acting to urge the main plunger to the open position shown in FIG. 2. When the rear face 52 of the main plunger abuts the wall 44 at the fully opened main plunger position, the exposed rear face area is greatly reduced and the main plunger is easily maintained in the fully opened position by the fluid pressure on the exposed face 48.

It can be understood that by varying the relative sizes of the areas subjected to fluid pressure, the response characteristics of the valve can be varied as desired. Since the opening of the valve is essentially dependent upon the flow through the pilot plunger conduit 64 while the closing is dependent upon flow through the apertures 56 and orifice 54, the opening and closing characteristics can be independently selected by use of the appropriate design. There is no fluid flow through the port 64, orifice 54 or apertures 56 except at the respective moments of opening or closing the valve and thus there is little possibility of fouling of these fluid passages. The valve is thus well suited for use with fluids containing foreign matter.

Figure 5:
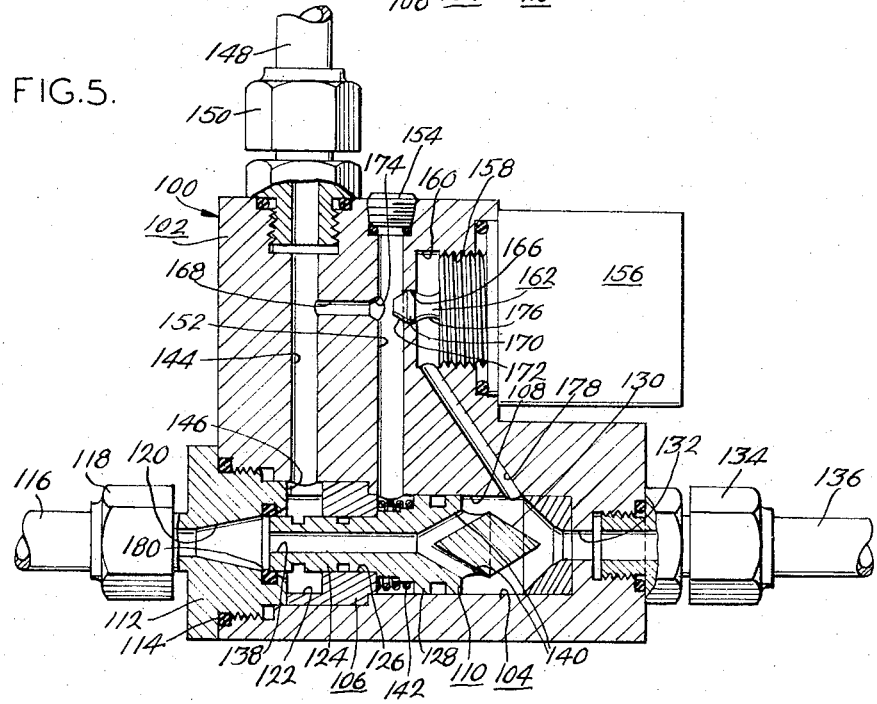
FIG. 5 is a view as in FIG. 4 showing the valve in the open position.

A second embodiment of the invention is shown in FIGS. 4 and 5 wherein is illustrated a three-way pilot valve 100 having a valve body 102. This embodiment is adapted for use in a fluid system having two fluid loops wherein the valve is employed to switch a continuous pressurized fluid flow either into a hydraulic actuator or to a fluid reservoir.

A stepped cylindrical valve cavity 104 in the valve body 102 is provided with an annular insert 106 to define a main plunger chamber 108 within which a main plunger 110 is slidably disposed. The insert 106 is secured in place by the abutting cap element 112 which is threadedly seated in the valve body and sealed by seal ring 114. An inlet conduit 116 is connected by terminal fitting 118 to the inwardly flared inlet port 120 of the cap element 112 which opens into a chamber 122 in the insert 106.

The main plunger 110 is characterized by a cylindrical portion 124 which is slidably journaled in a bore 126 in the insert 106. The plunger includes a cylindrical piston portion 128 at the opposite end thereof for sliding sealing relation within the main plunger chamber 108. The plunger terminates at its right hand end in an angled face 130 which is adapted for sealing coaction with a concentric outlet port 132 at the end of the valve cavity. The outlet port 132 is connected by means of terminal fitting 134 with an outlet conduit 136 which conducts fluid to a hydraulic actuator or other device.

The main plunger 110 includes an axial bore 138 extending through the cylindrical portion 124 thereof and diverging within the piston portion 128 to form a pair of passages 140 opening into the main piston chamber between the piston portion 128 and the plunger face 130.

A main plunger compression spring 142 is positioned between the insert 106 and the piston portion 128 of the plunger to provide a spring force urging the plunger into the closed position illustrated in FIG. 4.

A fluid passage 144 in the valve body extends perpendicularly from the valve cavity, opening into the chamber 122 through the port 146 in the insert 106. The passage 144 connects with the reservoir conduit 148 through the terminal fitting 150. Parallel to the fluid passage 144 is a similar fluid passage 152 which opens into the main plunger chamber 108 adjacent the insert 106. The fluid passage 152 is plugged at its upper end by plug 154.

An actuator 156 is threadedly secured to the valve body within a bore 158 therein perpendicular to the fluid passages 144 and 152. The actuator forms a pilot plunger chamber 160 within the bore 158 through which projects the pilot plunger 162 extending from the actuator piston 164. The pilot plunger extends through an orifice 166 and into the fluid passage 152. Axially aligned with the pilot plunger is a connecting passage 168 extending between the fluid passages 152 and 144.

The pilot plunger includes a cylindrical portion 170 adapted to close the orifice 166 upon retraction of the pilot plunger as shown in FIG. 5. The end face 172 of the pilot plunger is suited for sealing engagement with the flared port 174 of the connecting passage 168 to close said passage in the extended position of the pilot plunger as shown in FIG. 4. A neck portion 176 of the pilot plunger is of a reduced diameter sufficient to permit fluid flow through the orifice 166 when the pilot plunger is in the extended position. The pilot plunger chamber 160 is connected with the main plunger chamber 108 by the fluid passage 178, opening into the main plunger chamber at a point adjacent the outlet port 132.

In operation, as shown in FIG. 4, when the pilot plunger is in the extended position blocking the connecting passage 168, high pressure fluid passing through the main plunger, passage 178, pilot plunger chamber 160, orifice 166 and fluid passage 152 provides a high pressure region in the main plunger chamber 108 between the insert 106 and the piston portion 128 of the plunger, which pressure force in conjunction with the compression spring 142 acts to close the main plunger and maintain the face 130 of the plunger in sealing engagement with the outlet port 132. The chamber 122 is of an enlarged size to maintain as high a pressure as possible in this region to act against the left hand end of the main plunger. With the pilot plunger extended as shown in FIG. 4, the fluid flow is channeled exclusively into the reservoir conduit 148 through the fluid passage 144.

Upon retracting of the pilot plunger, the connecting passage 168 is open to the high velocity, low pressure flow through the fluid passage 144 and in connection with fluid passage 152 serves to lower the pressure in the main plunger chamber behind the piston portion 128 to the low fluid pressure of the fluid passage 144. The pressure in this region of the chamber ultimately reaches the low reservoir pressure as the main plunger moves to the left with the cylindrical portion 124 of the plunger cutting off the flow through the port 146 in the insert. The movement of the plunger to the left is caused by the differential pressure resulting from the high pressure fluid acting on the right hand end of the plunger, the relief of this pressure through the passage 178 being prevented by the closure of the orifice 166 by the pilot plunger. The main plunger on moving to the open position shown in FIG. 5 seats on the compressible seal ring 180 which prevents any fluid flow into the chamber 122.

The operation of the valve is shock-free, can be designed for fast response, and is suitable for use with high pressures. The valve, in addition, permits high flow rates with relatively low pressure drop. Extremely close tolerances are not required for the valve parts and dynamic seals with their associated problems are eliminated.

Manifestly, changes in details of construction can be

We claim:
1. A pilot valve for controlling fluid flow through a fluid system comprising a valve body, a valve cavity within said valve body, inlet and outlet ports opening into said valve cavity, a main plunger slidably disposed in said valve cavity for movement between a closed position and an open position, said main plunger having front and rear faces with the front face of said main plunger in the closed position of said plunger coacting with said outlet port to close said port, a main plunger housing on said valve body extending into said valve cavity defining a main plunger chamber adjacent the rear face of said main plunger, an orifice in a wall of said main plunger housing opposed from the rear face of said main plunger, said orifice being axially aligned with said main plunger, said orifice providing fluid communication of said main plunger chamber with said valve cavity, a pilot plunger extending through said orifice into said main plunger chamber, an actuator for selectively positioning said pilot plunger in an extended or retracted position, said pilot plunger in a retracted position adapted to seal said orifice, a port in said main plunger axially aligned with said orifice extending from the front to the rear face thereof, said port in the extended position of said pilot plunger being sealed by said plunger, said port in the closed position of said main plunger opening at the front face of said plunger into said outlet port, whereby when said main plunger is in the closed position, upon retracting of said pilot plunger to close said orifice, said port in said main plunger is opened to reduce the pressure in said main plunger chamber to the low pressure of said outlet port, the pressure differential between the front face of said main plunger and the rear face thereof serving to move said plunger into said main plunger chamber thus opening said valve, the movement of said pilot plunger to the extended position closing said port in said main plunger and opening said orifice thereby providing a high pressure region in said main plunger chamber which because of a low pressure on the face of said main plunger due to fluid flow thereacross provides a pressure differential acting to move said main plunger into the closed position.

2. A pilot valve for controlling fluid flow through a fluid system comprising a valve body, a valve cavity within said valve body, inlet and outlet ports opening into said valve cavity, a main plunger slidably disposed in said valve cavity for movement between a closed position and a open position, said main plunger having front and rear faces at its opposite ends respectively with the front face of said main plunger in the closed position coacting with said outlet port to close said port, means on said valve body extending into said valve cavity defining a main plunger chamber adjacent the rear face of said main plunger, a fluid reservoir passage in said valve body opening into said valve cavity adjacent the rear face of said main plunger when said plunger is in the closed position, said main plunger in the open position closing off said passage, said passage extending through said valve body and adapted for connection to a reservoir conduit, a fluid passage extending through said main plunger from a point in said valve cavity adjacent said inlet port to a point in said cavity adjacent said outlet port, fluid passage means connecting said main plunger chamber with said reservoir passage and with said valve cavity adjacent said outlet port, a pilot plunger adapted for coaction with said fluid passage means to selectively connect said main plunger chamber with either said reservoir passage or the valve cavity adjacent said outlet port, and an actuator for moving said pilot plunger between an extended position and a retracted position, the selective positioning of said pilot plunger determining the fluid pressure in said main plunger chamber thereby controlling the pressure differential acting on said main plunger and the position of said main plunger.

3. A pilot valve as claimed in claim 2, wherein said fluid passage means connecting said main plunger chamber with said reservoir passage and with said valve cavity adjacent said outlet port comprises a main plunger chamber fluid passage extending from said main plunger chamber, a connecting passage extending between said reservoir passage and said main plunger chamber passage, a pilot plunger chamber adjacent said main plunger chamber passage, an orifice in said valve body connecting said pilot plunger chamber with said main plunger chamber passage, said orifice being opposed from and axially aligned with said connecting passage, said pilot plunger extending through said orifice into said main plunger chamber passage, means on said pilot plunger adapted to close said connecting passage while opening said orifice in an extended position of said pilot plunger, and to open said connecting passage while closing said orifice in a retracted position of said pilot plunger, and a fluid passage connecting said pilot plunger chamber with said valve cavity adjacent said outlet port.

References Cited

UNITED STATES PATENTS

| | | | |
|---|---|---|---|
| 1,764,366 | 6/1930 | Stuebing | 251—38 X |
| 2,968,464 | 1/1961 | Olson | 251—25 X |

M. CARY NELSON, *Primary Examiner.*

A. ROSENTHAL, *Assistant Examiner.*